(12) United States Patent
Kimbrell et al.

(10) Patent No.: US 9,528,639 B2
(45) Date of Patent: Dec. 27, 2016

(54) TUBE SEAL

(75) Inventors: Eddie Kimbrell, Dacula, GA (US); Ted Lichoulas, Simpsonville, SC (US); John Toth, Clermont, FL (US)

(73) Assignee: AFL Telecommunications LLC, Duncan, SC (US)

( * ) Notice: Subject to any disclaimer, the term of this patent is extended or adjusted under 35 U.S.C. 154(b) by 367 days.

(21) Appl. No.: 14/112,486

(22) PCT Filed: Apr. 18, 2012

(86) PCT No.: PCT/US2012/034069
§ 371 (c)(1),
(2), (4) Date: Mar. 5, 2014

(87) PCT Pub. No.: WO2012/145394
PCT Pub. Date: Oct. 26, 2012

(65) Prior Publication Data
US 2014/0167411 A1 Jun. 19, 2014

Related U.S. Application Data

(60) Provisional application No. 61/476,404, filed on Apr. 18, 2011, provisional application No. 61/476,405, filed on Apr. 18, 2011, provisional application No. 61/476,409, filed on Apr. 18, 2011.

(51) Int. Cl.
| | |
|---|---|
| *F16L 17/00* | (2006.01) |
| *F16L 19/04* | (2006.01) |
| *H02G 9/02* | (2006.01) |
| *H02G 15/013* | (2006.01) |

(52) U.S. Cl.
CPC .............. *F16L 19/043* (2013.01); *H02G 9/02* (2013.01); *H02G 15/013* (2013.01)

(58) Field of Classification Search
USPC ................................. 285/351, 353, 343, 342
See application file for complete search history.

(56) References Cited

U.S. PATENT DOCUMENTS

| | | | | |
|---|---|---|---|---|
| 1,063,926 A | * | 6/1913 | Schuermann | ........... F16L 19/10 |
| | | | | 285/148.19 |
| 2,452,275 A | * | 10/1948 | Woodling | ............. F16L 19/065 |
| | | | | 285/341 |
| 2,469,851 A | * | 5/1949 | Stecher | ................... F16L 19/00 |
| | | | | 285/104 |

(Continued)

FOREIGN PATENT DOCUMENTS

| | | |
|---|---|---|
| GB | 203011 A | 3/1980 |
| GB | 2140577 A | 11/1984 |
| JP | 2002195459 A | 7/2002 |

OTHER PUBLICATIONS

International Search Report of PCT/US2012/034069 Dated Jun. 29, 2012.

(Continued)

*Primary Examiner* — Aaron Dunwoody
(74) *Attorney, Agent, or Firm* — Dority & Manning, P.A.

(57) ABSTRACT

A tube seal includes a tube through hole, a pressure housing tube seal penetration cavity for an elastomeric interference seal, a ferrule sealing surface for a ferrule, and an internal channel for a backing nut. A tube penetrates through the backing nut, the ferrule, the elastomeric interference seal and the tube through hole.

6 Claims, 16 Drawing Sheets

(56) References Cited

U.S. PATENT DOCUMENTS

| | | | | |
|---|---|---|---|---|
| 3,248,135 | A | * | 4/1966 | Meripol ............... F16L 19/086 285/323 |
| 3,266,824 | A | * | 8/1966 | Nealy .................... F16L 19/08 285/212 |
| 4,138,145 | A | * | 2/1979 | Lawrence ............. F16L 19/061 285/23 |
| 5,368,336 | A | * | 11/1994 | Van Vleet ............... F16L 25/14 285/139.1 |
| 6,056,331 | A | * | 5/2000 | Benett .................... F16L 19/02 285/334.4 |
| 6,928,864 | B1 | | 8/2005 | Henry et al. |
| 7,806,443 | B1 | * | 10/2010 | Plattner ................ F16L 19/103 285/249 |
| 7,900,974 | B1 | * | 3/2011 | Plattner ................ F16L 19/061 285/332.1 |
| 8,840,152 | B2 | * | 9/2014 | Carcagno ........... F16L 19/0206 285/333 |
| 2003/0197379 | A1 | * | 10/2003 | Glover .................... F16L 19/12 285/342 |
| 2004/0094951 | A1 | | 5/2004 | Sigrist et al. |
| 2010/0011556 | A1 | | 1/2010 | Eccleston et al. |

OTHER PUBLICATIONS

AFL Telecommunications. LLC; European Patent Application No. 12774038.9; European Search Report; Feb. 2, 2016; (1 page).

\* cited by examiner

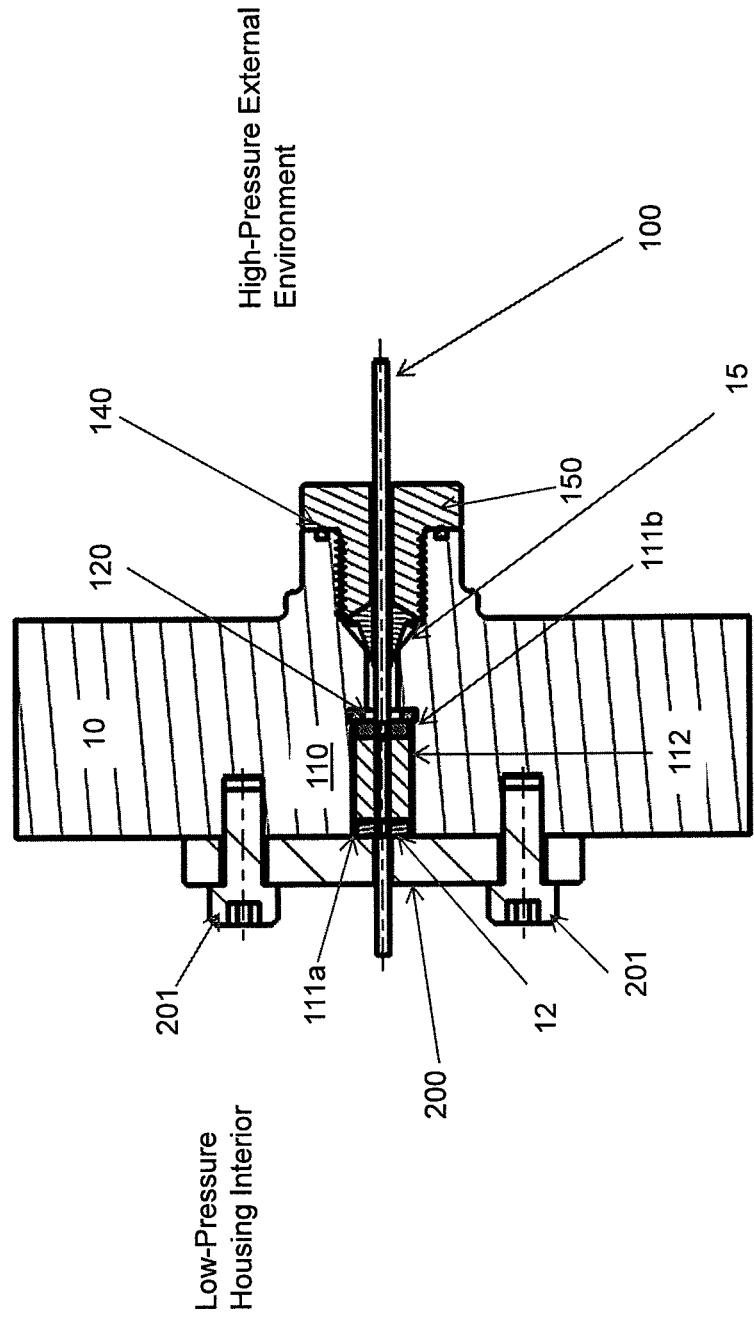

TUBE SEAL

CROSS-REFERENCE TO RELATED APPLICATIONS

This application is based upon and claims the benefit of priority from U.S. Provisional Application No. 61/476,405, filed Apr. 18, 2011, U.S. Provisional Application No. 61/476,404, filed Apr. 18, 2011 and U.S. Provisional Application No. 61/476,409, filed Apr. 18, 2011, the disclosures of which is incorporated herein in their entirety by reference.

BACKGROUND

1. Field

The present invention relates generally to a tube seal system used to protect communications in subsea environment, and more particularly, to a tube seal system which can provide a high reliability and redundant penetrations through pressure boundaries.

2. Related Art

In communications, it is common practice to package copper and fiber optic conductors in stainless steel tubes (SSTs) that are part of a cable, and to create pressure-tight tube seals to allow the tubes carrying copper and fiber optic conductors to penetrate into pressure housings. Many methods have been employed solve this technical problem of providing a pressure-tight tube seals into pressure housings in a subsea or other high pressure gradient environment.

Here are some of related art tube seals used in the field.

1. Elastomeric interference seals: These seals are common in subsea pressure housing tube penetration applications and provide a radial seal on the tube.

2. Swages: Swaging involves loosely fitting parts together, and compressing and deforming the fitting ferrule and tube interface using a mechanical or hydraulic tool, creating a permanent joint. These seals are common in a wide variety of pressure sealing applications, such as, instrumentation, subsea pressure housing tube seals, chemical processing pressure seals, mining, and nuclear.

3. Epoxy Cones: These seals are common in subsea pressure housing tube penetration applications.

4. Gland Seals: These seals function by axial compression and are common in subsea pressure housing tube penetration applications.

5. Ferrule-based penetrators: These seals involve having two optical-ferrules making contacts across a pressure boundary.

However, here are some of the challenges faced by current tube sealing technology used in subsea systems. First, by using swages without Elastomeric interference seal, these seals are susceptible to over-tightening at installation and prone to mechanical creep failure. Second, using Elastomeric interference seals without redundant swage may cause elastomeric material failure if the seal is directly exposed to chemicals.

On the other hand, gland seals are effective in low pressure applications only, and if the gland seals are exposed directly to environment, they could be degraded by trace chemicals or UV-exposure.

O-rings can point load and crush/deform a tube at high pressures resulting in seal leakage or tube failure.

In using epoxy glands penetrations, there exists the potential for possible bond-line delamination between the tube-epoxy interface resulting in leakage.

Lastly, ferrule-based penetrators can be expensive, bulky, and susceptible to contamination during assembly. Further, contact between ferrules in high pressure applications may result in high optical loss.

These methods typically provide a single leak path protection which may limit long-term seal reliability and deployment depths. The current invention provides a means to provide an all mechanical, redundant tube seal that provides a greater long-term reliability than what is available in current art.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

A first embodiment of a tube seal includes a tube through hole, a pressure housing tube seal penetration cavity for an elastomeric interference seal, a ferrule sealing surface for a ferrule; and an internal channel for a backing nut, where a tube penetrates through the backing nut, the ferrule, the elastomeric interference seal and the tube through hole.

Another embodiment of the tube seal in the first embodiment may have the backing nut pressing an O-ring into an O-ring channel disposed on a pressure housing wall.

Another embodiment of the tube seal in the first embodiment may have the backing nut including an epoxy cavity.

Another embodiment of the tube seal in the first embodiment may have an epoxy disposed inside the epoxy cavity of the backing nut.

Another embodiment of the tube seal in the first embodiment may have a tube penetrating through the epoxy.

Another embodiment of the tube seal in the first embodiment may include a retaining ring slot and a retaining ring.

Another embodiment of the tube seal in the first embodiment may have the backing nut, O-ring, O-ring channel, ferrule, ferrule sealing surface, and an exterior surface of the tube together forming a first sealing mechanism.

Another embodiment of the tube seal in the first embodiment may have the elastomeric interference seal, elastomeric interference seal interior sealing surface, pressure housing tube seal penetration cavity, retaining ring, and the exterior surface of the tube form a second sealing mechanism.

Another embodiment of the tube seal in the first embodiment may have the elastomeric interference seal inserted from a low-pressure housing interior side of a pressure housing wall and the ferrule and the backing nut are inserted from a high-pressure external environment side of the pressure housing wall.

A second embodiment of a tube seal includes a tube through hole, a pressure housing tube seal penetration cavity for an elastomeric interference seal, and an internal channel for a backing nut, where a tube penetrates through the backing nut, the elastomeric interference seal and the tube through hole.

Another embodiment of the tube seal in the second embodiment may have the backing nut pressing an O-ring into an O-ring channel disposed on a pressure housing wall.

Another embodiment of the tube seal in the second embodiment may have the backing nut including an epoxy cavity.

Another embodiment of the tube seal in the second embodiment may have an epoxy disposed inside the epoxy cavity of the backing nut.

Another embodiment of the tube seal in the second embodiment may have a tube penetrating through the epoxy.

Another embodiment of the tube seal in the second embodiment may have a lock washer slot, and a lock washer.

Another embodiment of the tube seal in the second embodiment may have the backing nut, the O-ring, the O-ring channel, the epoxy and an exterior surface of the tube together forming a first sealing mechanism.

Another embodiment of the tube seal in the second embodiment may have the elastomeric interference seal, the elastomeric interference seal interior sealing surface, the pressure housing tube seal penetration cavity, the lock washer, and the exterior surface of the tube forming a second sealing mechanism.

A third embodiment of a tube seal includes a tube through hole, a pressure housing tube seal penetration cavity for an elastomeric interference seal, and an internal channel for a swage assembly, where a tube penetrates through the swage assembly, the elastomeric interference seal and the tube through hole.

Another embodiment of the tube seal in the third embodiment may have the swage assembly including a swage body, a ferrule disposed inside the swage body, a fitting cap, and an O-ring.

Another embodiment of the tube seal in the third embodiment may have the elastomeric interference seal inserted from a low-pressure housing interior side of a pressure housing wall and the swage assembly is inserted from a high-pressure external environment side of the pressure housing wall.

BRIEF DESCRIPTION OF THE DRAWINGS

FIG. 4B shows an enlarged cross-sectional view of another embodiment of assembled O-ring/swage/elastomeric interference tube seal.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
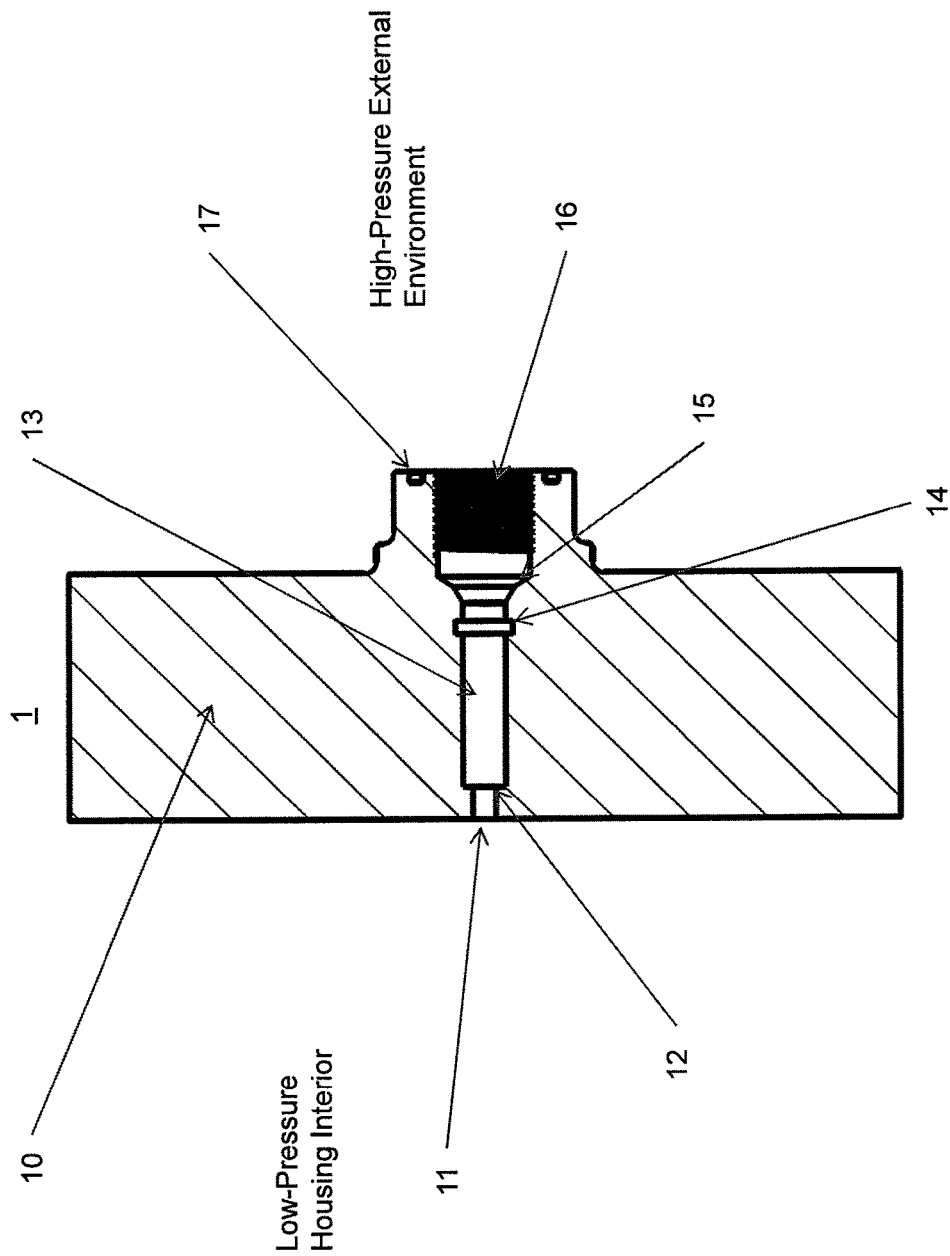
FIG. 1 shows a pressure housing swage tube seal penetration cavity.

FIG. 1 shows a pressure housing tube seal penetration cavity. In the current embodiment, a low-pressure pressure housing interior is on the left-hand side of a pressure housing wall 10, and a high-pressure external environment is on the right-hand side of the pressure housing wall 10. That is, the demarcation between the low-pressure pressure housing interior and the high-pressure environment is the pressure housing wall 10.

A pressure-tight tube (100 in FIG. 2) housing one or more copper or fiber optic conductors (not shown) penetrates the pressure housing 1, passing through the pressure housing tube seal penetration cavity 13 and tube through hole 11 into the interior of the pressure housing 1. The pressure-tight tube 100 (shown in FIG. 2) may be constructed from corrosion-resistant metal (316 SSTL) or of any other corrosion resistant material or another less corrosion resistant material coated with a high-density polyethylene (HDPE) or similar polymer/coating/finish to improve its corrosion resistance when exposed to a hostile, high pressure, or potentially corrosive environment.

In the current embodiment, two distinct pressure sealing regions are shown. The first region consists of an O-ring channel 17 in which an O-ring 140 may be used, a backing nut (150 shown in FIG. 2), an internal channel 16 for backing nut 150, and a ferrule sealing surface 15. The second region consists of pressure housing tube seal penetration cavity 13, in which a retaining ring slot may be used 14 and elastomeric interference seal interior sealing surface 12. These two regions identified above provide a separate leak path protection and when coupled together thereby creating a redundant sealing mechanism utilizing unique sealing methods which compliment each other. The internal channel 16 and the backing nut 150 are shown to have threaded surface to be mechanically joined. However, the internal channel 16 and the backing nut 150 can be welded together without having threaded portions.

Figure 2:
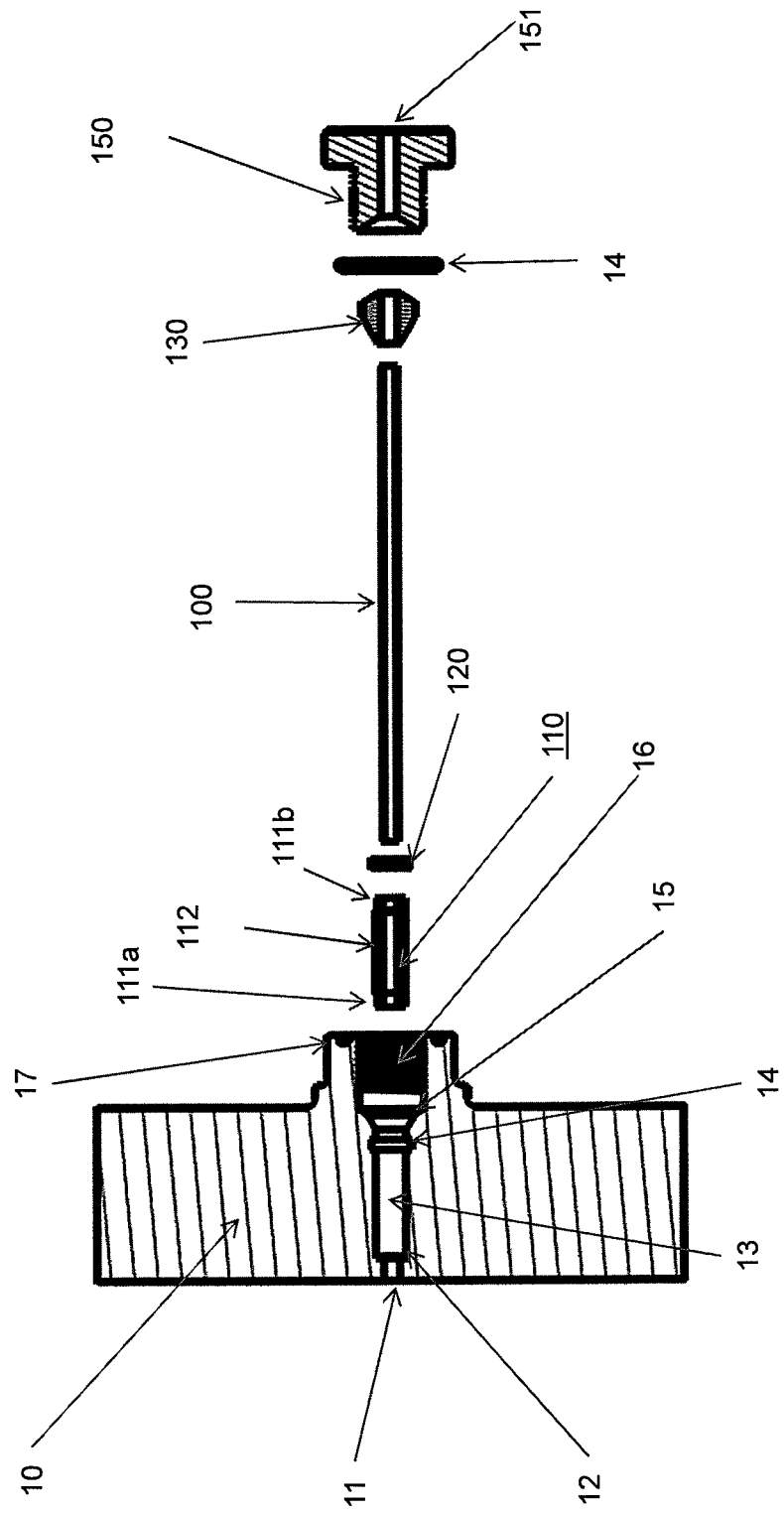
FIG. 2 shows an exploded view of O-ring/swage/elastomeric interference tube seal.

FIG. 2 shows an exploded view of O-ring/swage/elastomeric interference tube seal. Only a segment of the pressure-tight tube 100 is shown. The tube 100 is typically an integral member of a cable. If a coating such as HDPE has been applied to the tube, the section of coating is removed from the tube prior to the installation of the elastomeric interference seal 110 components and ferrule 130. An elastomeric interference seal 110 comprising of a left-hand washer 111a, a right-hand 111b and an elastomeric tube 112 is seated in the pressure housing tube seal penetration cavity 13 with the left-hand washer 111a seated against the elastomeric interference seal interior sealing surface. A retaining ring 120 (or a lock washer) may be installed in the retaining ring slot 14, making contact with the right-hand washer 111b.

In general, an elastomeric interface seal is a radial compression/stretch seal that functions differently than a gland seal, which is an axial compression seal. Although in the current embodiment, a widely known Morrison seal is used as the elastomeric interference seal, any other seals that can act as a radial compression/stretch seal can be used.

The backing nut 150 compresses the O-ring 140 in the O-ring channel 17 and the ferrule 130 against the ferrule sealing surface 15. The ferrule 130 is tapered where the wide end is pushed against the backing nut 150. This action compresses of the narrow end of the ferrule 130 against the tube 100 and forms a pressure-tight boundary against the tube 100. The left-hand washer 111a, the elastomeric tube 112, the right-hand washer 111b, the retaining ring 120, the ferrule 130 and the backing nut all have a slot in the middle of their cross-section where the tube 100 can penetrate through.

Figure 3:
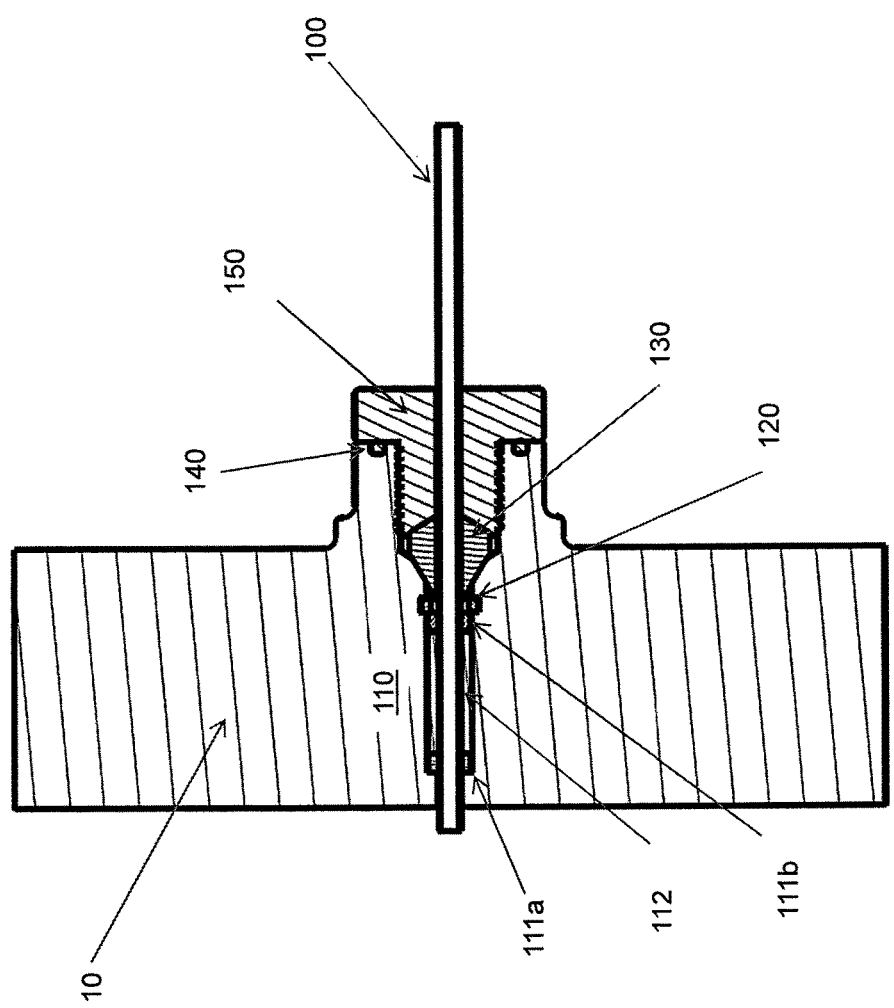
FIG. 3 shows a cross-sectional view of assembled O-ring/swage/elastomeric interference tube seal.

FIG. 3 shows an assembled swage/elastomeric interference tube seal. As shown in FIG. 3, the O-ring, swage and elastomeric interference tube seal 110 are in close proximity in order to optimize space.

Figure 4:
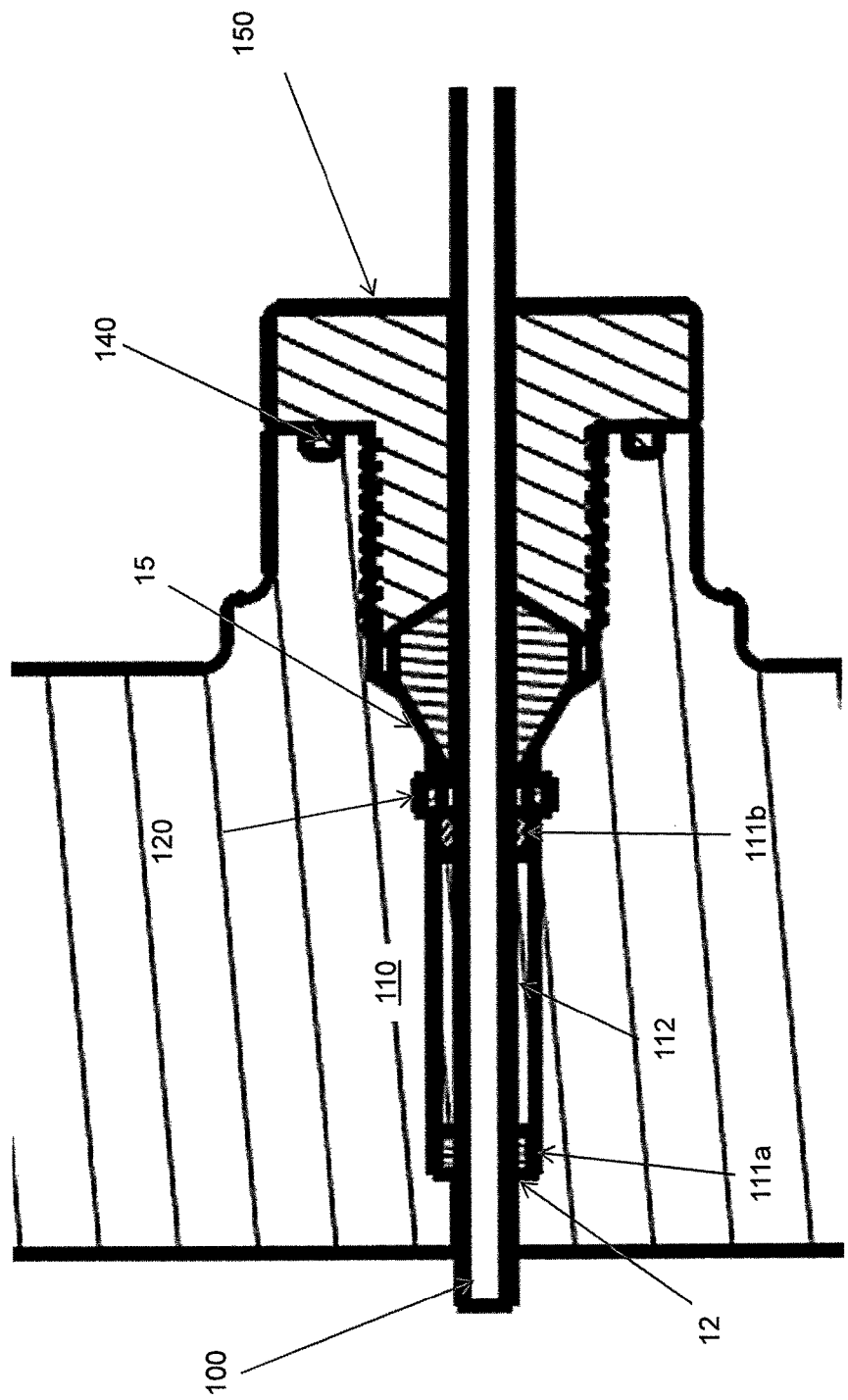
FIG. 4 shows an enlarged cross-sectional view of assembled O-ring/swage/elastomeric interference tube seal.

FIG. 4 shows an enlarged view of assembled O-ring/swage/elastomeric interference tube seal. FIG. 4 shows a close-up detail of the tube penetration. The first sealing mechanism is formed by the backing nut 150, the O-ring 140, the O-ring channel 17, the ferrule 130, the ferrule sealing surface 15, and an exterior surface of the tube 100. The second sealing mechanism is formed by the elastomeric interference seal 110 consisting of washers 111a and 111b and elastomeric tube 112, elastomeric interference seal interior sealing surface 12, pressure housing tube seal penetration cavity 13, retaining ring 120, if used, and the exterior surface of the tube 100.

Figure 4A:
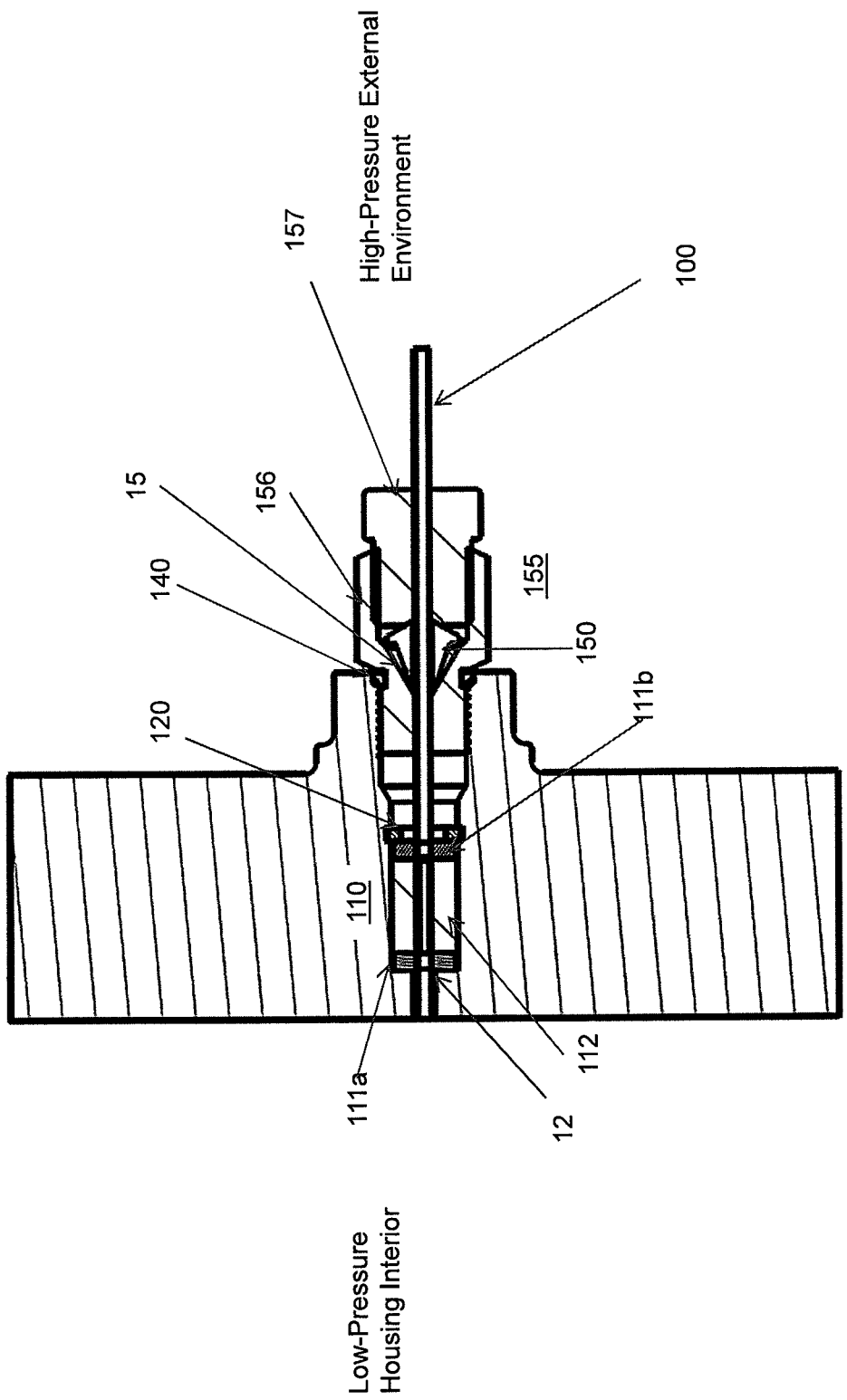
FIG. 4A shows an enlarged cross-sectional view of another embodiment of assembled O-ring/swage/elastomeric interference tube seal using commercially-available tube seal assembly.

FIG. 4A shows an enlarged view of another embodiment of assembled O-ring/swage/elastomeric interference tube seal using commercially-available off the shelf (COTS) swage type fitting installed in the same pressure housing wall as shown in FIG. 4. The purchased fitting comes with as a swage assembly 155 with four separate components.

Those components are a swage body 156 that screws into the screw threads in the pressure housing, a ferrule 130 functioning the same as shown in FIG. 4, a fitting cap 157 which press the ferrule 130 against the ferrule sealing surface 15 and an O-ring 140 that seats in a machined bevel surface in the pressure housing as shown. As shown in FIG. 4A, the ferrule 130 is integrated within the swage body unlike the embodiment shown in FIG. 4.

Although the swage body 156 is shown to be threaded into the pressures housing wall 10, the swage body 156 can also be mechanically attached to the pressure housing wall by welding without having threaded portions or any other mechanical means available.

FIG. 4B shows an enlarged view of another embodiment of assembled O-ring/swage/elastomeric interference tube seal where a retaining ring 120, if used, washers 111a and 111b and an elastomeric tube 112 are inserted from a low-pressure housing interior side of a pressure housing wall 10 into the pressure housing wall 10. On the other hand, the ferrule 130 and the backing nut 150 are inserted from a high pressure external environmental side of the pressure housing wall 10. Once the retaining ring 120, if used, the washers 111a and 111b and elastomeric tube 112 are inserted, a backer plate 200 is removable fastened to the pressure housing wall 10 using fasteners 201.

Figure 5:
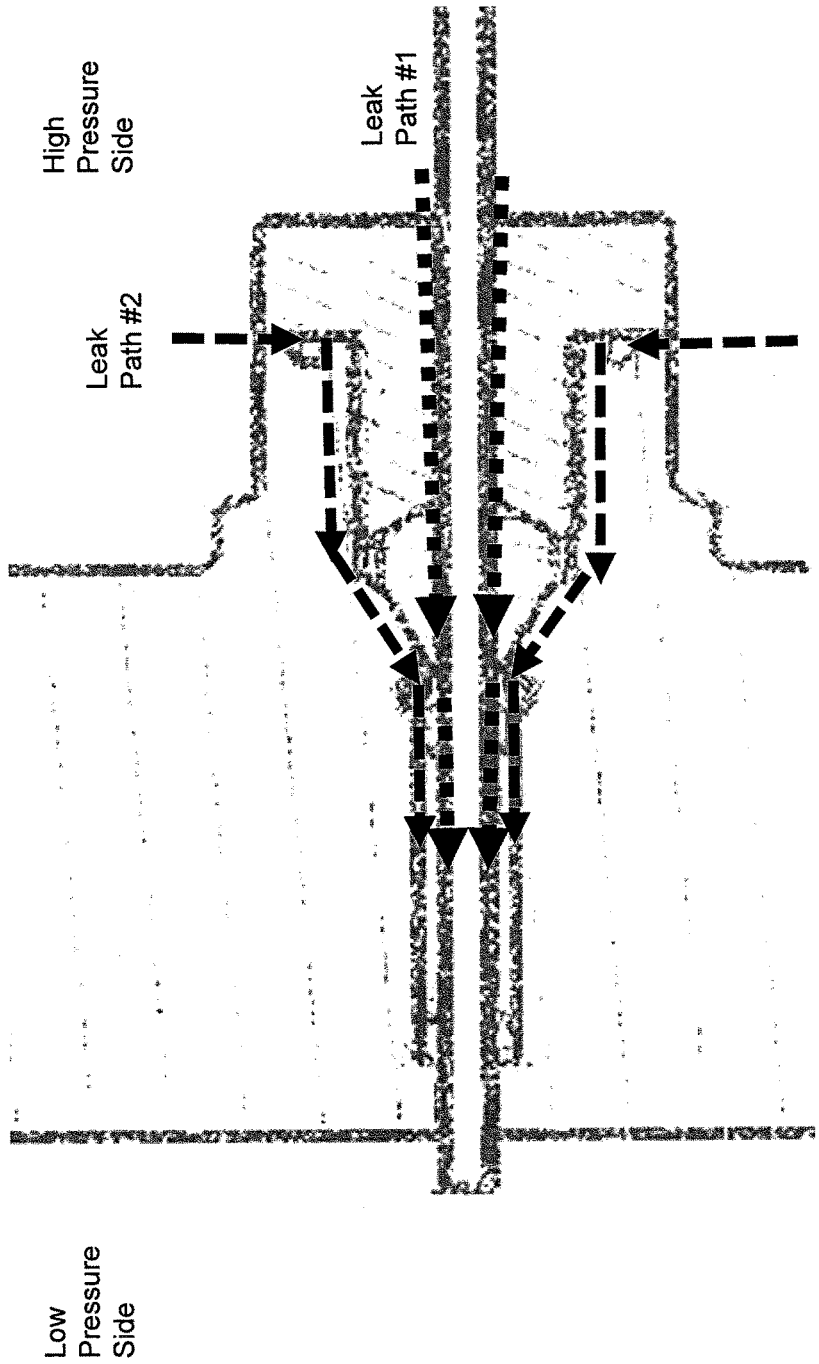
FIG. 5 shows an assembled O-ring/swage/elastomeric interference tube seal potential leak paths.

FIG. 5 shows an assembled O-ring/swage/elastomeric interference tube seal pressure seal boundaries. Two possible leak path examples are shown:

Leak Path #1: In the first leak path example shown in FIG. 5, a high pressure fluid leaks into the space between the exterior surface of the tube 100 and the backing nut tube penetration 151. The compression of the ferrule 130 against the exterior surface of the tube 100 and the compression of ferrule 130 against the ferrule sealing surface 15 created by the backing nut 150 pressing/pushing the ferrule 130 together form the primary seal. In the first leak path example, if the primary sealing mechanism is breached, the fluid is ported to the elastomeric interference seal 110. This seal mechanism provides the secondary seal mechanism against high pressure fluid leakage and thereby creating sealing redundancy.

Leak Path #2: In the second leak path example shown in FIG. 5, a high pressure fluid leaks in the space between the backing nut 150 and the pressure housing 1, leaks around the compressed O-ring 140, and through the tortuous threads 16 joining the backing nut 150 and pressure housing 10. In this example the primary seal is formed by the backing nut 150 and O-ring 140 interface, and the compression of the ferrule 130 against the ferrule sealing surface 15. In the second leak path example, if the primary seal is breached, the elastomeric interference seal 110 provides the secondary, redundant seal and prevents fluid from entering the pressure vessel.

In FIGS. 1-5, the O-ring 140 is not a required element to provide redundant sealing. The O-ring 140 provides yet another sealing mechanism in the current embodiment.

The embodiment shown in FIGS. 1-5 provides the following advantages over the existing related tube seal technology in subsea or any other high pressure system where the benefits of redundant sealing would be of value. First, the new tube seal provides a redundant pressure sealing against multiple leak-paths. Some of the components used to make the new invention are commercially available off the shelf (COTS). The new tube seal consists of all mechanical construction and therefore the seals are manufacturable with standard mechanical work practices and are repeatable. The tubes shown can be disassembled and reassembled to support manufacturing and maintenance procedures at low cost and the seal features provides resistance to tube tensile, flexing, and twisting forces effectively.

Figure 6:
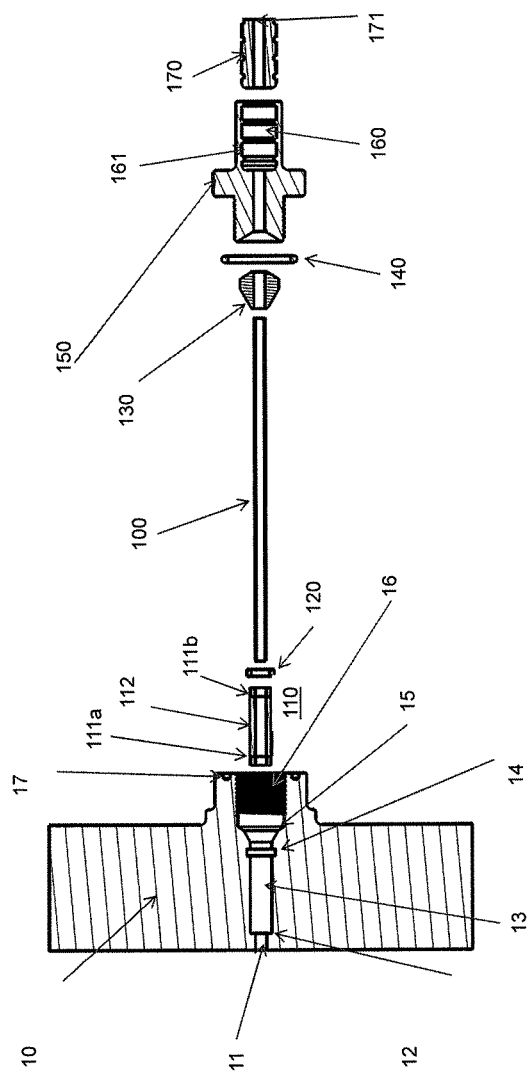
FIG. 6 shows an exploded view of O-ring/swage/epoxy/elastomeric interference tube seal.

FIG. 6 shows an exploded view of O-ring/swage/epoxy/elastomeric interference tube seal. As shown in FIG. 6, only a segment of the pressure-tight tube 100 is shown, and the tube 100 is typically an integral member of a cable. If a coating such as HDPE has been applied to the tube, the section of coating is removed from the tube prior to the installation of the elastomeric interference seal 110 components and ferrule 130. An elastomeric interference seal 110 comprising of a left-hand washer 111a, a right-hand 111b and an elastomeric tube 112 is seated in the pressure housing tube seal penetration cavity 13 with the left-hand washer 111a seated against the elastomeric interference seal interior sealing surface 12. A retaining ring (or a lock washer) 120 may be installed in the retaining ring slot 14, making contact with the right-hand washer 111b.

In the current embodiment, the backing nut 150 has an epoxy cavity on an opposite side where the backing nut pushes against a ferrule 130. The backing nut epoxy cavity 160 is filled with an epoxy 170. The epoxy forms a pressure tight seal around the tube 100 with epoxy tube seal 171 and provides a cohesive, flexible bond with a ribbed interior surface 161 of the backing nut 150.

In the current embodiment shown in FIG. 6, the backing nut epoxy cavity is filled with the epoxy 170. However, the epoxy can be replaced with a polyethylene or any caulking material.

The backing nut 150 compresses the O-ring 140 in the O-ring channel 17 and the ferrule 130 against the ferrule sealing surface 15. The ferrule 130 is tapered where the wide end is pushed against the backing nut 150. This action compresses of the narrow end of the ferrule 130 against the tube 100 and forms a pressure-tight boundary against the tube 100. The left-hand washer 111a, the elastomeric tube 112, the right-hand washer 111b, the retaining ring 120, the ferrule 130, the backing nut and the epoxy 170 all have a slot in the middle of their cross-section where the tube 100 can penetrate through.

Figure 7:
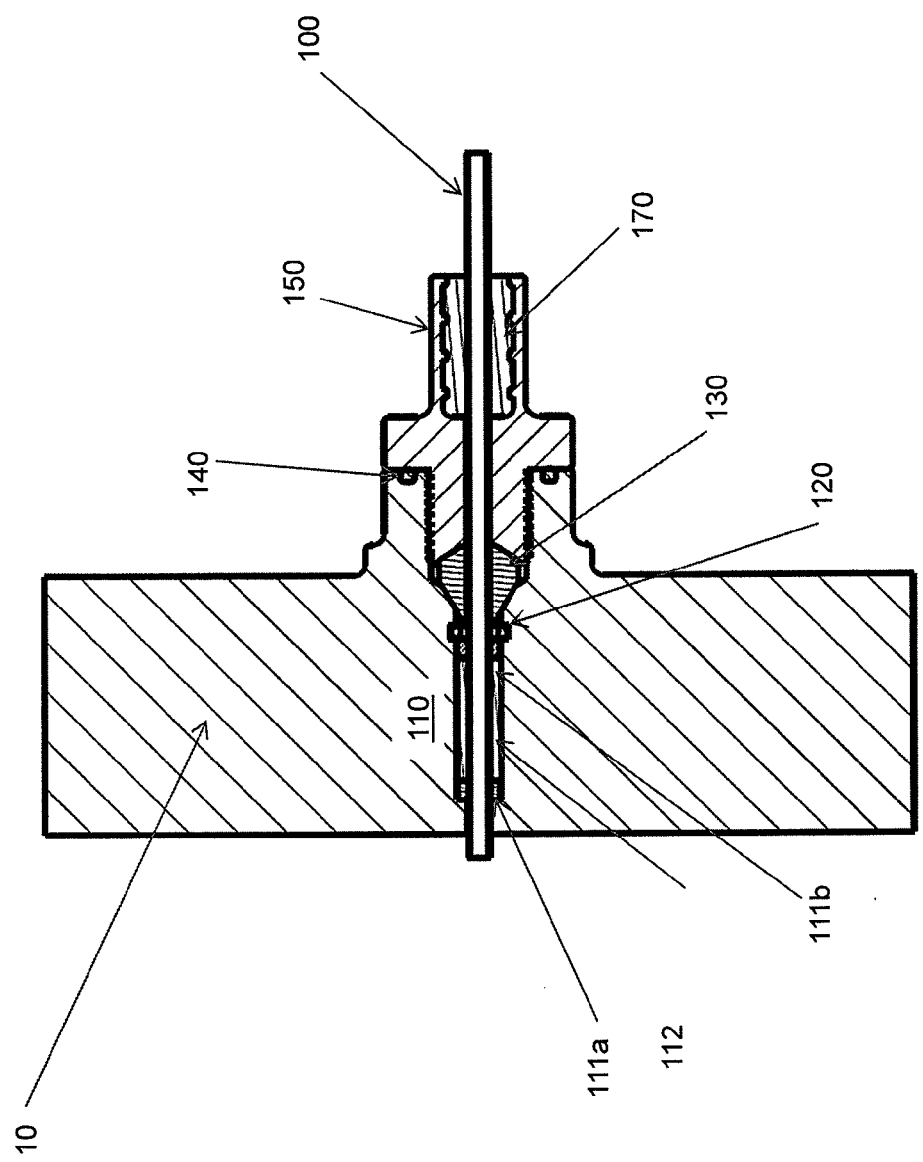
FIG. 7 shows a cross-sectional view of assembled O-ring/swage/epoxy/elastomeric interference tube seal.

FIG. 7 shows an assembled O-ring/swage/epoxy/elastomeric interference tube seal. As shown in FIG. 7, the O-ring, swage, epoxy, and elastomeric interference tube seal are in close proximity in order to optimize space.

Figure 8:
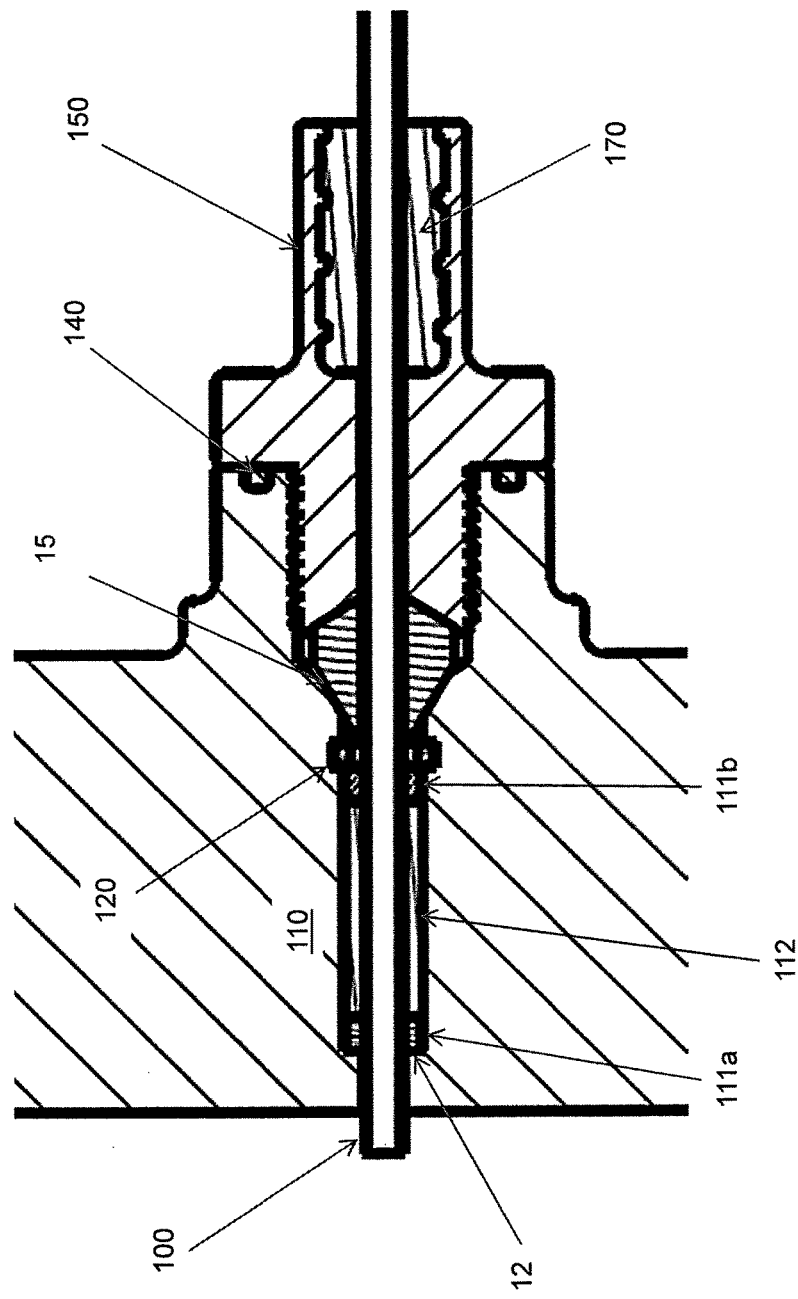
FIG. 8 shows an enlarged cross-sectional view of assembled O-ring/swage/epoxy/elastomeric interference tube seal.

FIG. 8 shows an enlarged view of assembled O-ring/swage/epoxy/elastomeric interference tube seal. FIG. 8 shows close-up detail of the tube penetration. The first sealing mechanism is formed by the backing nut 150, O-ring 140, O-ring channel 17, ferrule 130, ferrule sealing surface 15, epoxy 170, and the exterior of the tube 100. The second sealing mechanism is formed by the elastomeric interference seal 110 (washers 111a and 111b and elastomeric tube 112), the elastomeric interference seal interior sealing surface 12, the pressure housing tube seal penetration cavity 13, the retaining ring 120, if used, and the exterior of the tube 100.

Figure 9:
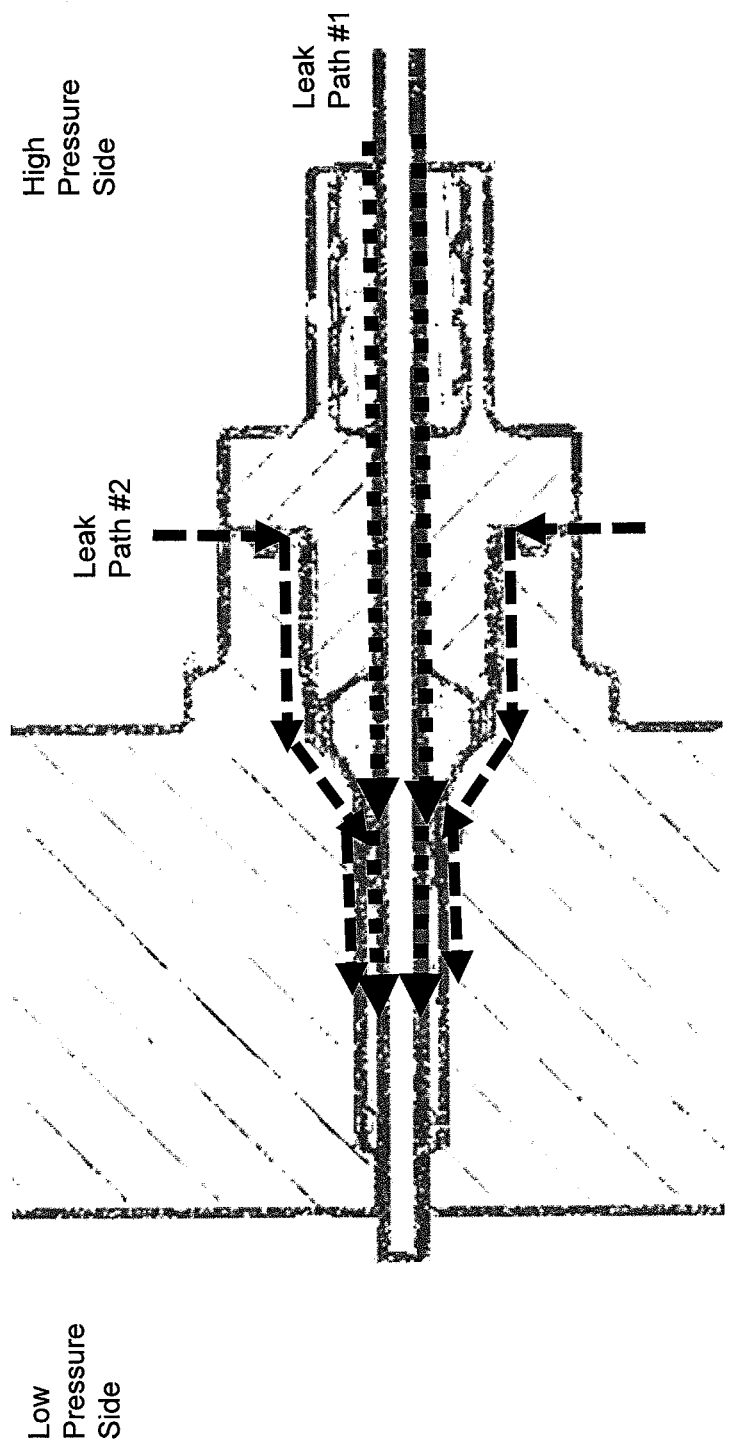
FIG. 9 shows an assembled O-Ring/swage/epoxy/elastomeric interference tube seal potential leak paths.

FIG. 9 shows an assembled O-ring/swage/epoxy/elastomeric interference tube seal pressure boundaries. Two possible leak paths examples are shown:

Leak Path #1: In the first leak path example shown in FIG. 9, a high pressure fluid leaks into the space between the exterior of the tube 100 and epoxy tube seal located in the backing nut 150. The epoxy tube seal 171 around the tube wall and the backing nut 150 provide an additional compliant sealing membrane between the exterior of the tube 100 and an inner diameter of the epoxy tube seal. An additional seal is provided between the ribbed interior surface 161 of the backing nut 150 with epoxy cavity 160. The epoxy seal along with the compression of the ferrule 130 against the exterior surface of the tube 100 and the compression of ferrule 130 against the ferrule sealing surface 15 created by the backing nut 150 pressing/pushing the ferrule 130 together form the primary seal. In the first leak path, if the primary seal is breached, the elastomeric interference seal 110 provides—the secondary redundant seal against the high pressure fluid leakage.

Leak Path #2: In the second leak path example shown in FIG. 9, a high pressure fluid leaks in the space between the backing nut 150 and the pressure housing 1, leaks around the compressed O-ring 140, and through the tortuous threads on the internal channel 16 joining the backing nut 150 and pressure housing 10. In this example the primary seal is formed by the backing nut 150 and O-ring 140 interface, and the compression of the ferrule 130 against the ferrule sealing surface 15. In the second leak path example, if the primary seal is breached, the elastomeric interference seal 110 provides the secondary, redundant seal and prevents fluid from entering the pressure vessel.

In FIGS. 6-9, the O-ring 140 and epoxy 170 are not required elements for a redundant sealing configuration. The O-ring 140 and epoxy 170 provide yet another sealing mechanism in the current embodiment. The embodiment shown in FIGS. 6-9 provides the following advantages over the existing related tube seal technology in subsea system and other high pressure systems. First, the system shown in the embodiments provides a redundant pressure sealing against all leak-paths and some components used to make the invention are commercially available off the shelf (COTS). A mechanical seal with epoxy is manufacturable with standard mechanical work practices. This mechanical seal can be tested and validated before the epoxy seal is applied, and with the proper selection of epoxies, the epoxy seal forms a high strength bond with the tube (uncoated or coated). For an uncoated tube, this bond minimizes the risk of chloride stress and pitting corrosion if the tube seal is immersed in a high pressure saltwater environment. Since most cable tubes are thin-walled, localized corrosion can significantly reduce its lifetime in a seawater environment. This system allows tubes seals to be created for coated tubes and provides resistance to tube tensile, flexing, and twisting forces at the termination interface.

In the current embodiment shown in FIGS. 6-9, the backing nut epoxy cavity 160 is filled with the epoxy 170. However, the epoxy 170 can be replaced with any sealing adhesive.

Figure 10:
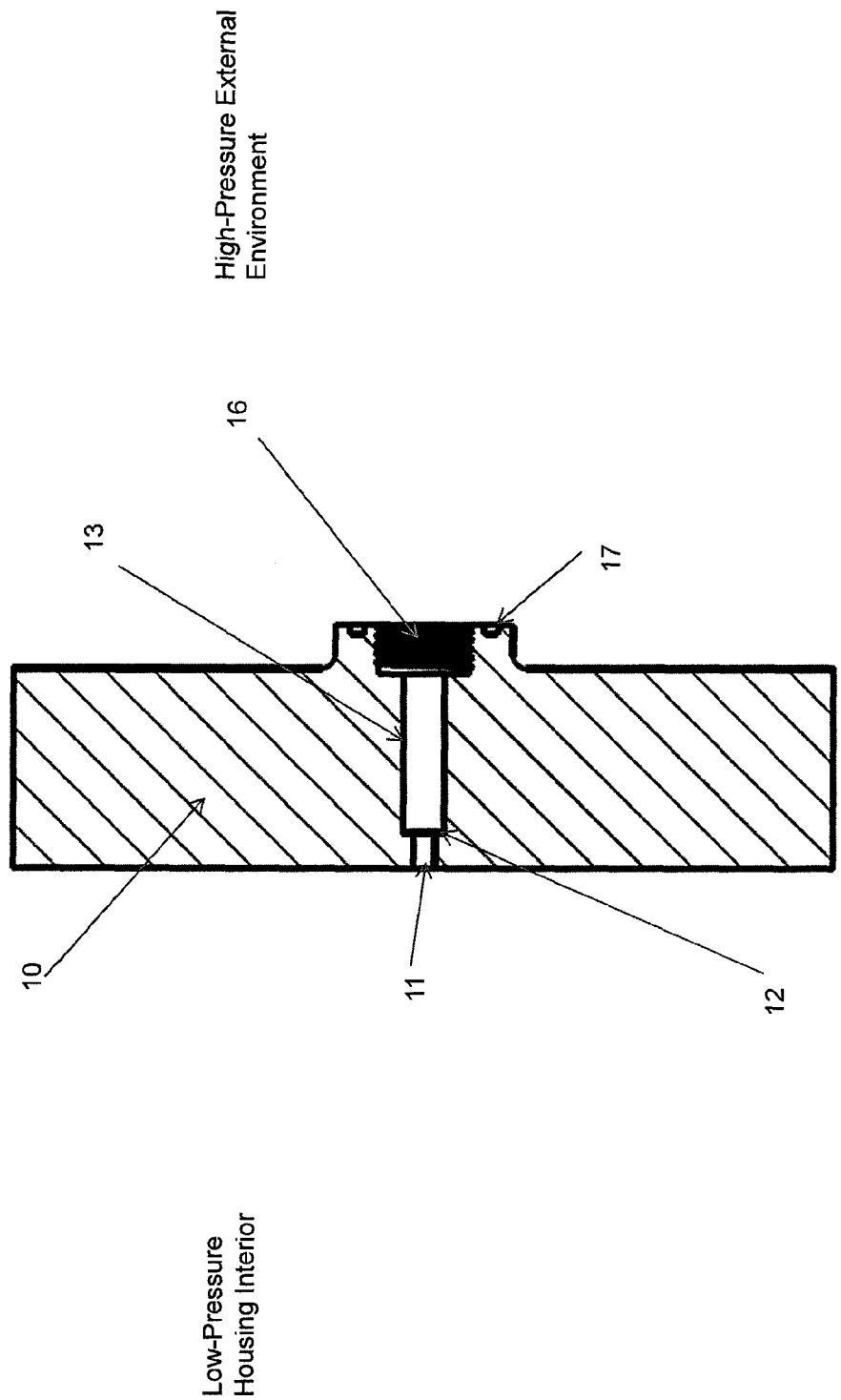
FIG. 10 shows a pressure housing tube seal penetration cavity without swage.

FIG. 10 shows another embodiment of pressure housing tube seal penetration cavity. Similar to FIG. 1, a low-pressure pressure housing interior is on the left-hand side of a pressure housing wall 10, and a high-pressure external environment is on the right-hand side of the pressure housing wall 10. That is, the demarcation between the low-pressure pressure housing interior and the high-pressure environment is the pressure housing wall 10.

The pressure-tight tube 100 housing one or more copper or fiber optic conductors (not shown) penetrates the pressure housing 1, passing through the pressure housing tube seal penetration cavity 13 and tube through hole 11 into the interior of the pressure housing 1.

The tube 100 may be constructed of corrosion-resistant metal (316 SSTL) and may be coated with but not limited to a HDPE to improve its corrosion resistance when exposed to the high pressure, hostile, potentially corrosive environment.

In the current embodiment, two distinct pressure sealing regions are shown. The first region consists of an O-ring channel 17 for an O-ring 140 and internal channel 16 for backing nut 150. The second region consists of pressure housing tube seal penetration cavity 13, retaining ring slot (not shown), if used, and elastomeric interference seal interior sealing surface 12. These two regions identified above provide a separate leak path protection thereby creating a redundant sealing. The internal channel 16 and the backing nut 150 are shown to have threaded surface to be mechanically joined. However, the internal channel 16 and the backing nut 150 can be welded together without having threaded portions or any other mechanical means available.

Figure 11:
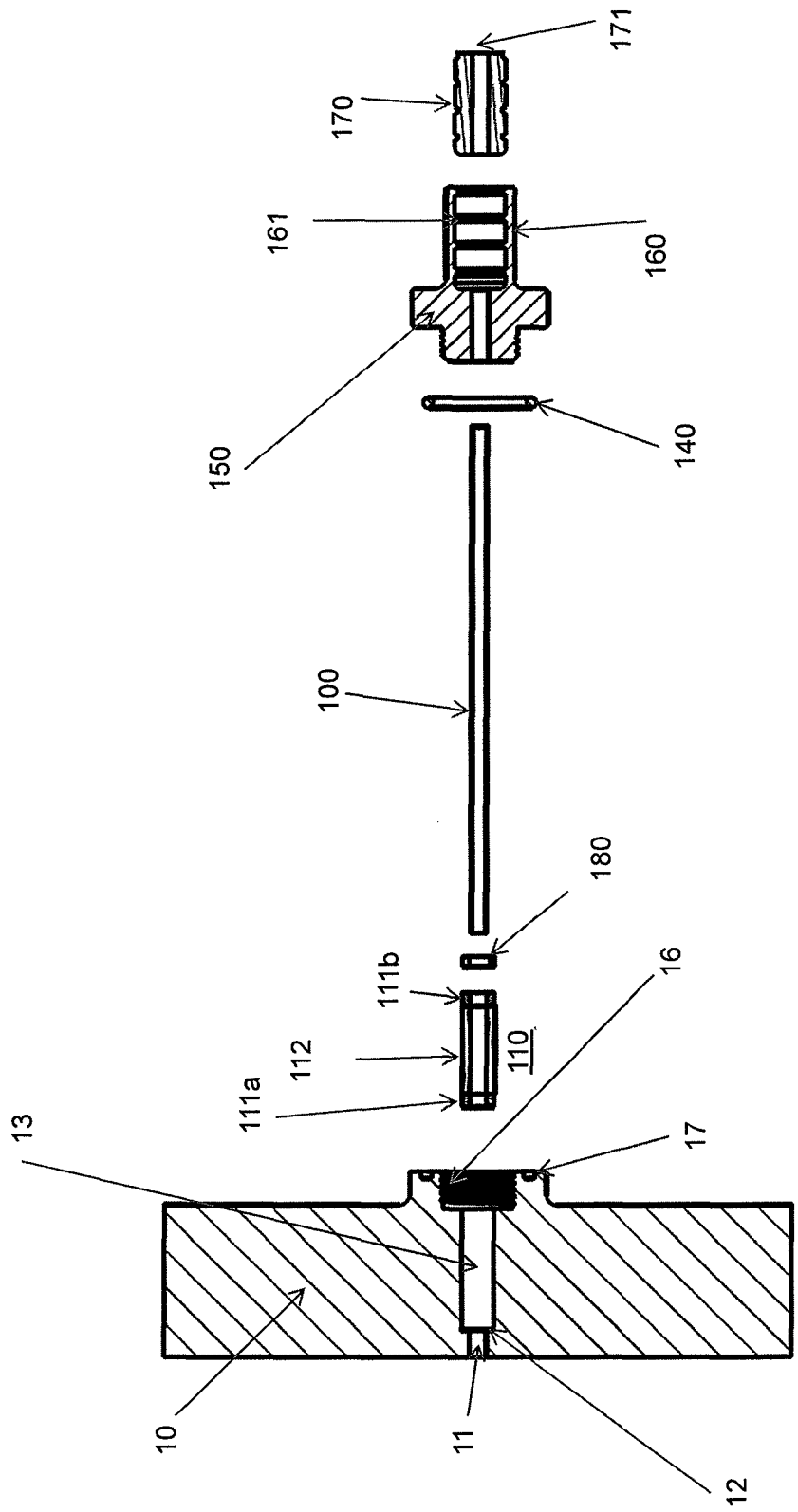
FIG. 11 shows an exploded view of O-ring/backing nut/epoxy/elastomeric interference tube seal.

FIG. 11 shows an exploded view of O-ring/epoxy/elastomeric interference tube seal. If a coating has been applied to the tube 100, the section of coating is removed from the tube prior to the installation of the elastomeric interference seal components. An elastomeric interference seal 110 comprising of a left-hand washer 111a, a right-hand 111b and an elastomeric tube 112 is seated in the pressure housing tube seal penetration cavity 13 with the left-hand washer 111a seated against the elastomeric interference seal interior sealing surface. A lock washer 180 may be installed between the right-hand washer 111b and the backing nut 150, ensuring the elastomeric interference seal right-hand washer 111b is constrained.

The backing nut 150 compresses the O-ring 140 in the O-ring channel 17 and the ferrule 130 against the ferrule sealing surface 15. The ferrule 130 is tapered where the wide end is pushed against the backing nut 150. This action compresses of the narrow end of the ferrule 130 against the tube 100 and forms a pressure-tight boundary against the tube 100. The left-hand washer 111a, the elastomeric tube 112, the right-hand washer 111b, the lock washer 180, the ferrule 130 and the backing nut 150 all have a slot in the middle of their cross-section where the tube 100 can penetrate through.

Figure 12:
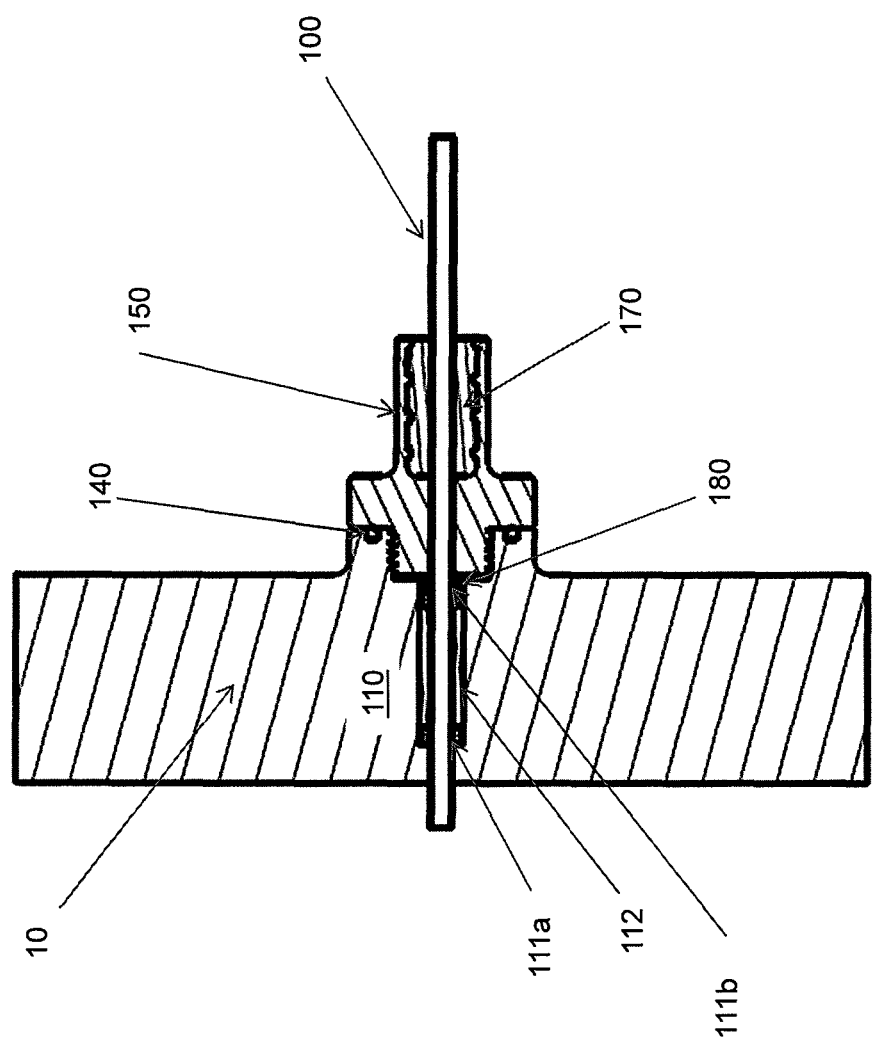
FIG. 12 shows a cross-sectional view of assembled O-ring/backing nut/epoxy/elastomeric interference tube seal.

FIG. 12 shows an assembled O-ring/epoxy/elastomeric interference tube seal. As shown in FIG. 12, O-ring, epoxy, and elastomeric interference tube seal are in close proximity in order to optimize space.

Figure 13:
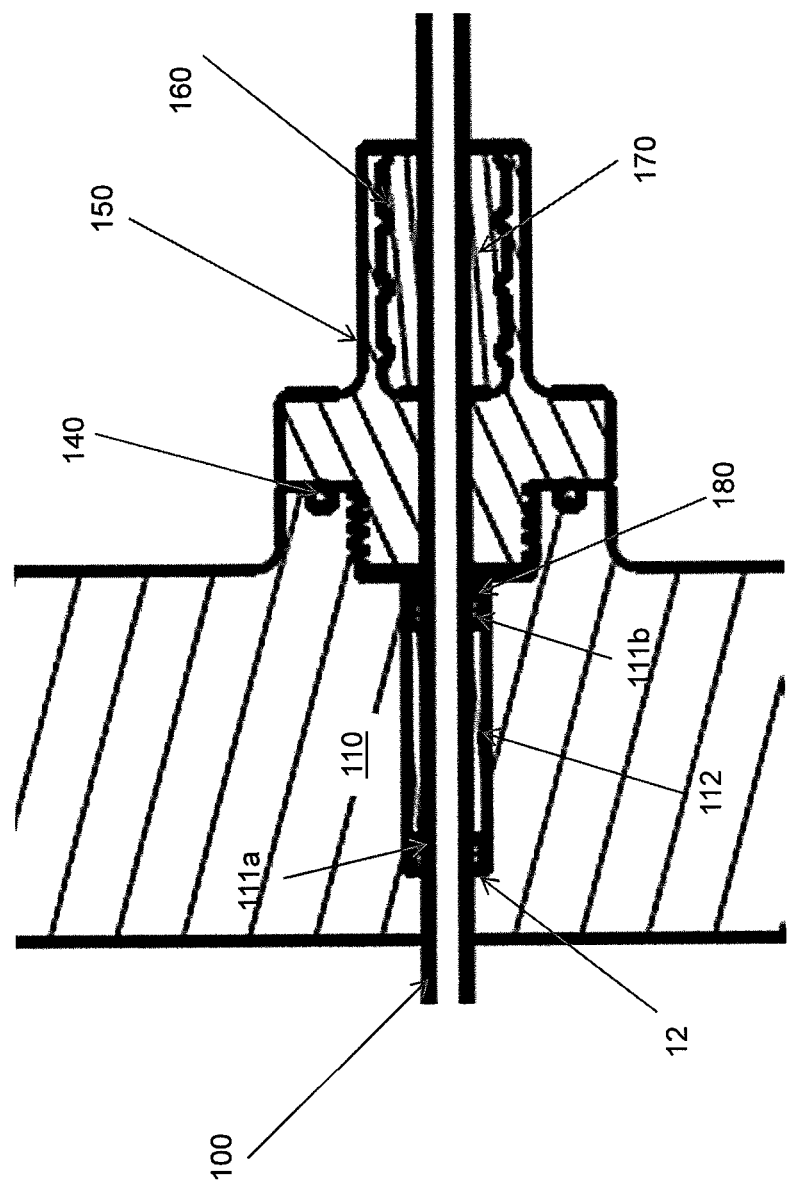
FIG. 13 shows an enlarged cross-sectional view of assembled O-ring/backing nut/epoxy/elastomeric interference tube seal.

FIG. 13 shows an assembled O-Ring/epoxy/elastomeric interference tube seal. FIG. 13 shows close-up detail of the tube penetration. The first sealing mechanism is formed by the backing nut 150, the O-ring 140, the O-ring channel 17, the epoxy 170, and the exterior of the tube 100. The second sealing mechanism is formed by the elastomeric interference seal 110 (washers 111a and 111b and the elastomeric tube 112), the elastomeric interference seal interior sealing surface 12, the pressure housing tube seal penetration cavity 13, the lock washer 180, if used, and the exterior of the tube 100.

Figure 14:
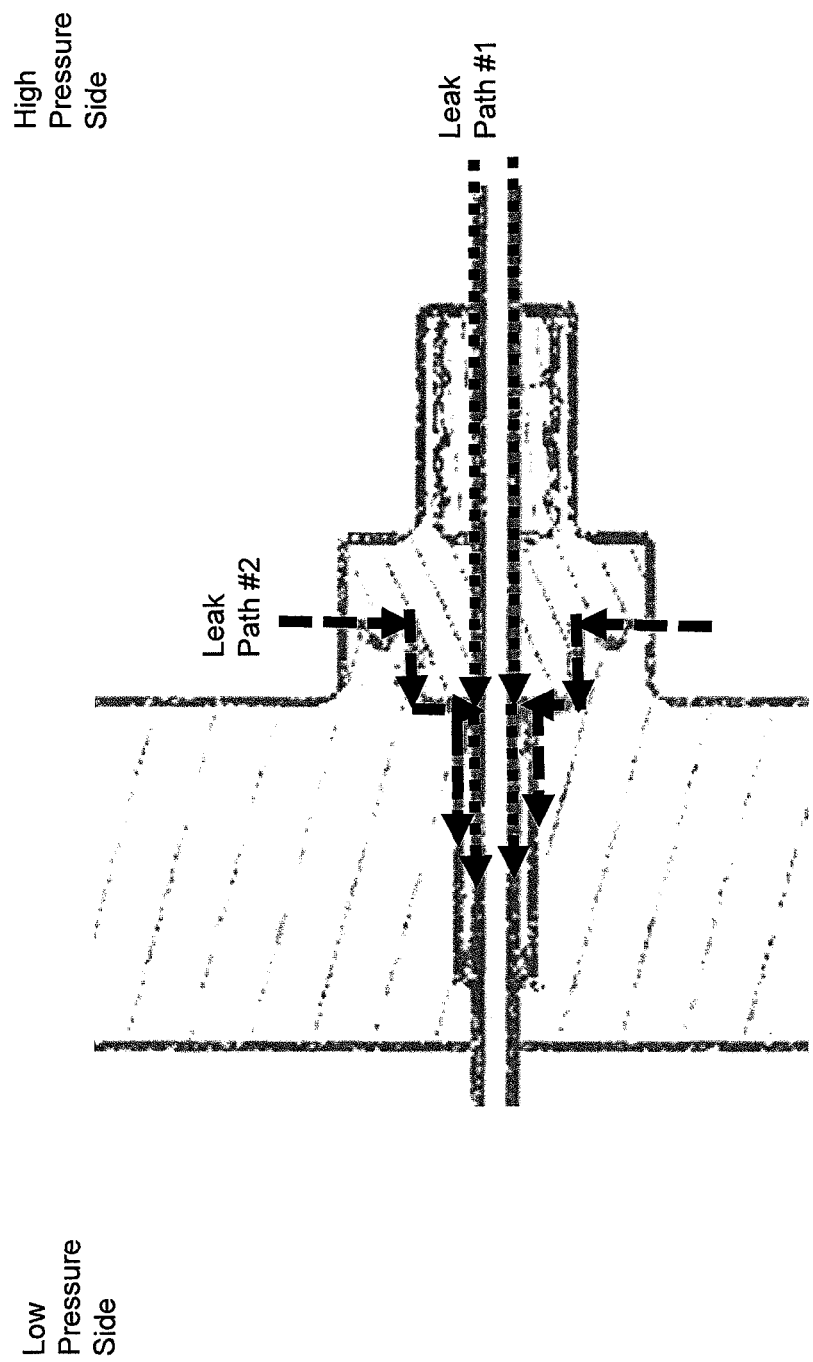
FIG. 14 shows an assembled O-ring/backing nut/epoxy/elastomeric interference tube seal potential leak paths.

FIG. 14 shows an assembled O-ring/epoxy/elastomeric interference tube seal pressure boundaries. Two example leak paths are shown:

Leak Path #1: In the first leak path example shown in FIG. 14, a high pressure fluid leaks into the space between the exterior of the tube 100 and epoxy tube seal located in the backing nut 150. In the first leak path example, the epoxy tube seal 171 forms the primary barrier against high pressure fluid leakage. If the primary epoxy sealing mechanism is breached in this example, the fluid is ported to the elastomeric interference seal 110. This seal mechanism provides the secondary seal mechanism against high pressure fluid leakage.

Leak Path #2: In the second leak path example shown in FIG. 14, a high pressure fluid leaks in the space between the backing nut 150 and the pressure housing 1, leaks around the compressed O-ring 140, and through the tortuous threads 16 joining the backing nut 150 and pressure housing 10. In this example the primary seal is formed by the backing nut 150 and O-ring 140 interface. In the second leak path example, if the primary seal is breached, the elastomeric interference seal 110 provides the secondary, redundant seal and prevents fluid from entering the pressure vessel.

In the current embodiment shown in FIG. 10-14, an epoxy 170 is used in backing nut epoxy cavity 160. However, the epoxy can be replaced with any sealing adhesive.

The embodiment shown in FIGS. 10-14 provides all the benefits describes regarding other embodiments and provides an additional feature that it allows the majority of the pressure sealing surfaces to be incorporated into the pressure housing structure.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in a descriptive sense only and not for purposes of limitation.

What is claimed is:

1. A tube seal comprising:
a tube through hole;
a pressure housing tube seal penetration cavity for an elastomeric interference seal, the elastomeric interference seal seated in the pressure housing tube seal penetration cavity and comprising an elastomeric tube, a left-hand washer and a right-hand washer;
a retaining ring slot;
a retaining ring installed in the retaining ring slot;
a ferrule sealing surface for a ferrule; and
an internal channel for a backing nut,
wherein a tube penetrates through the backing nut, the ferrule, the retaining ring, the elastomeric interference seal and the tube through hole.

2. The tube seal of claim 1, wherein the backing nut presses an O-ring into an O-ring channel disposed on a pressure housing wall.

3. The tube seal of claim 2, wherein the backing nut, O-ring, O-ring channel, ferrule, ferrule sealing surface, and an exterior surface of the tube together form a first sealing mechanism.

4. The tube seal of claim 1, wherein the elastomeric interference seal, the elastomeric interference seal interior sealing surface, the pressure housing tube seal penetration cavity, and the exterior surface of the tube form a second sealing mechanism.

5. A tube seal comprising:
a tube through hole;
a pressure housing tube seal penetration cavity for an elastomeric interference seal, the elastomeric interference seal seated in the pressure housing tube seal penetration cavity and comprising an elastomeric tube, a left-hand washer and a right-hand washer; and
a retaining ring slot;
a retaining ring installed in the retaining ring slot;
an internal channel for a backing nut,
wherein a tube penetrates through the backing nut, the retaining ring, the elastomeric interference seal and the tube through hole.

6. The tube seal of claim 5, wherein the backing nut presses an O-ring into an O-ring channel disposed on a pressure housing wall.

* * * * *